United States Patent [19]

Pinto

[11] 4,251,094

[45] Feb. 17, 1981

[54] SPIRALLY WOUND CORRUGATED PIPE CONNECTOR

[75] Inventor: Mario R. Pinto, Oakland, Calif.

[73] Assignee: Noll Manufacturing Co., San Pablo, Calif.

[21] Appl. No.: 37,624

[22] Filed: May 10, 1979

[51] Int. Cl.³ ............................................. F16L 13/14
[52] U.S. Cl. .................................. 285/382.5; 29/523; 29/157 R; 285/424; 285/DIG. 4
[58] Field of Search ............ 285/382.4, 382.5, DIG. 4, 285/424, 382.2; 29/507, 522, 506, 157 R

[56] References Cited

U.S. PATENT DOCUMENTS

| | | | |
|---|---|---|---|
| 568,574 | 9/1896 | Hoyer | 29/523 |
| 1,315,904 | 9/1919 | Bever | 285/382.5 X |
| 1,938,194 | 12/1933 | Ruder | 285/382.5 X |
| 3,290,770 | 12/1966 | Silverman et al. | 285/382.5 X |
| 3,758,139 | 9/1973 | Meserole | 285/DIG. 4 |

*Primary Examiner*—Dave W. Arola
*Attorney, Agent, or Firm*—Townsend and Townsend

[57] ABSTRACT

An improved system for attaching a connecting device to the end of a spirally wound corrugated pipe section is disclosed. A conventional connector element is used which includes a first cylindrical portion adapted to connect to a corresponding connector element and a second cylindrical portion adapted to be inserted into the end of the corrugated pipe section. The outer diameter of the second cylindrical portion is approximately equal to but no greater than the inside diameter of the corrugated pipe section. A collar having a cylindrical portion with an inwardly directed circumferential flange is fitted over the end of the pipe so that the flange is beyond the end of the pipe section. The cylindrical portion of the collar has an inner diameter approximately equal to but no less than the outer diameter of the corrugated pipe section. The cylindrical portion of the connector element inside the end of the pipe section is forced radially outwardly to crush the end of the corrugated pipe segment flat against the collar. An axial portion of the overlapping connector element, pipe section and collar in combination is distended outwardly to form a bead. Crushing the end of the pipe segment between the connector element and collar and formation of the bead provide an air tight connection between the pipe section and the connector element.

7 Claims, 4 Drawing Figures

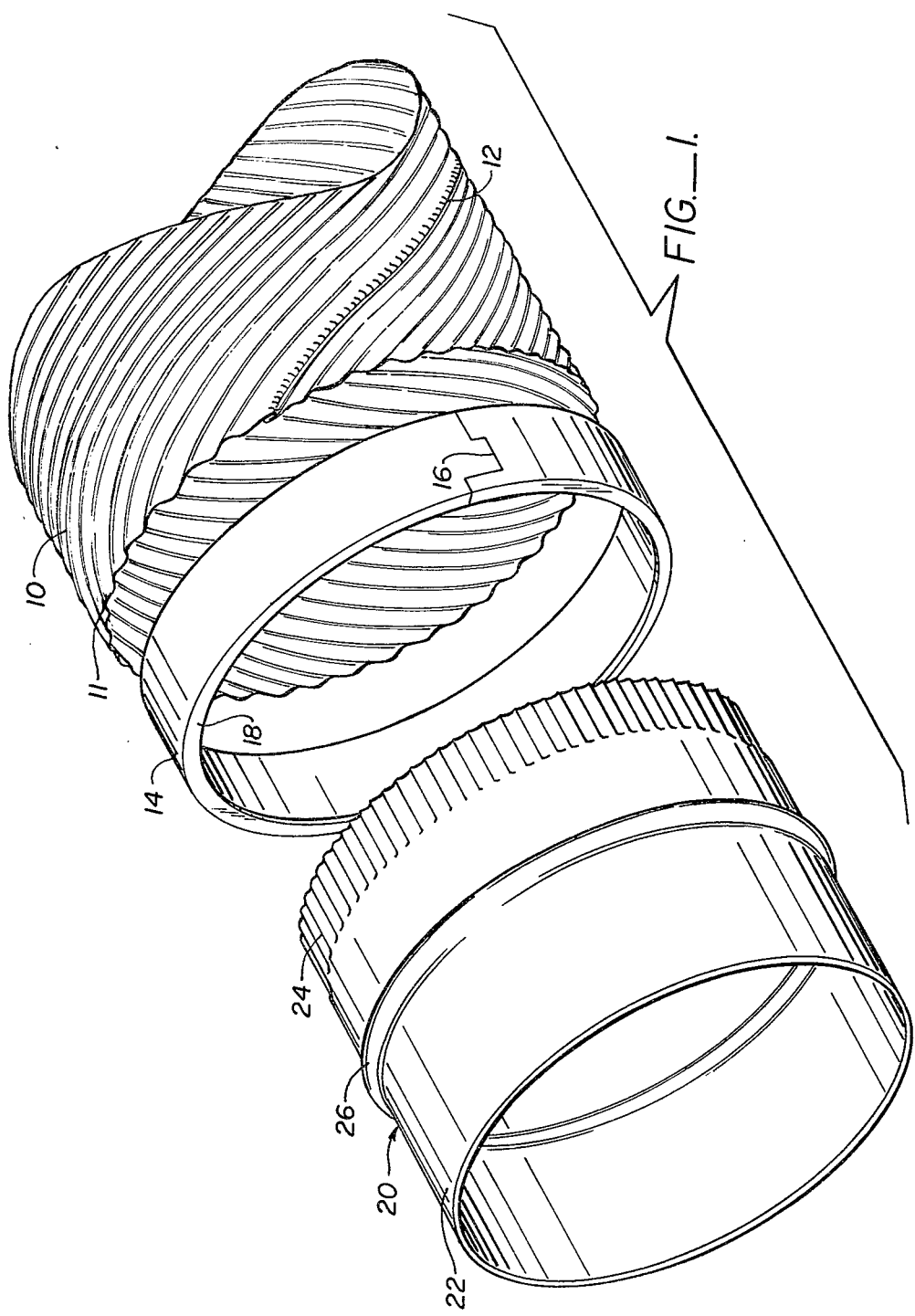

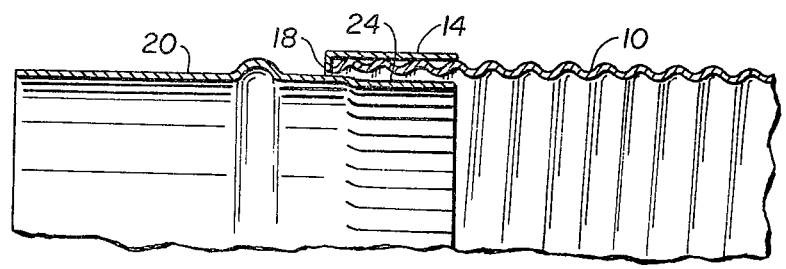
FIG._2A.
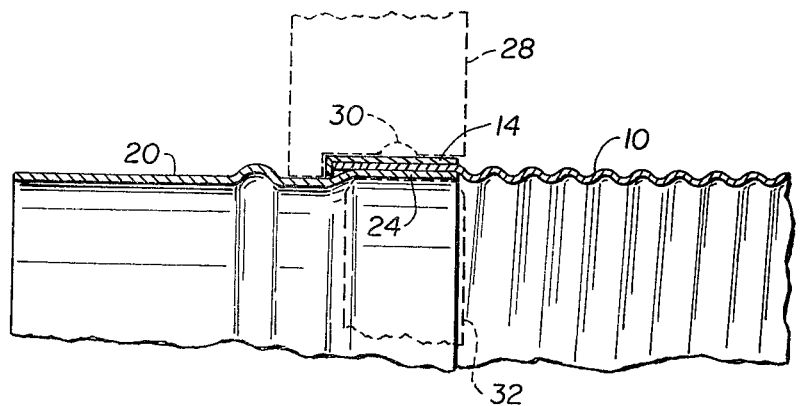
FIG._2B.
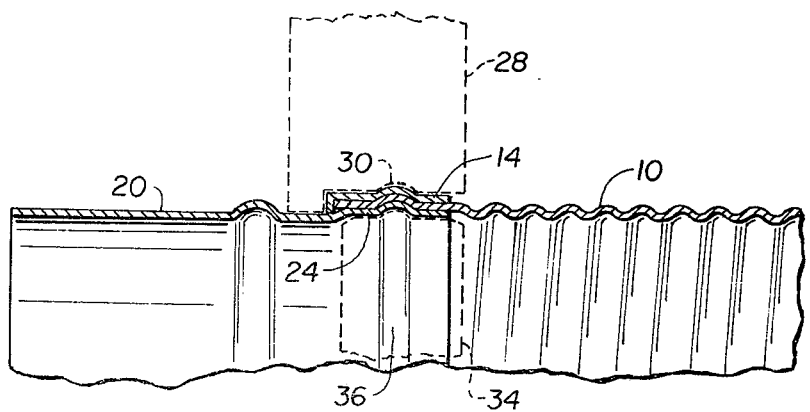
FIG._2C.

SPIRALLY WOUND CORRUGATED PIPE CONNECTOR

BACKGROUND OF THE INVENTION

The present invention relates to connector systems for spirally wound corrugated pipe used in ducting, and in particular to an improved system for attaching conventional connector elements to the end of a corrugated pipe.

Spirally wound corrugated pipe has become used with increasing frequency in ducting for heating, ventilation and air conditioning (often called the HVAC industry). Such pipe is relatively easy to fabricate and is therefore reasonably inexpensive. In addition, because the pipe is spirally wound and corrugated, it is somewhat flexible, and thus readily installed in a variety of ducting applications.

The advantages of using spirally wound corrugated pipe for ducting are somewhat counterbalanced by the problems involved in obtaining air tight connections between pipe sections. Male and female connector elements are typically installed at the ends of the pipe, which mate together to form a relatively air tight seal. The problem arises in the attachment of the connector elements themselves to the ends of the corrugated pipe sections. Spirally wound corrugated pipe inherently has a rippled configuration at its ends, rendering it difficult to form an air tight seal with the connector element.

Air tight seals in ducting used in the HVAC industry are of paramount concern at the present time because the increasing cost of energy supplies makes it mandatory that such ducting be highly efficient. Any gaps in the seals result in a leakage of the ducted material, requiring more energy input to achieve the desired heating or cooling goals.

It is the present practice in the industry to apply a mastic material between the interior of the end of the corrugated pipe section and the connector element. The mastic fills in the spaces between the connector element and the end of the corrugated pipe section, and also acts as an adhesive to bind the connector element to the pipe. If necessary, staples or self-penetrating rivets are also used to fasten the connector element to the pipe.

The mastic is typically applied by hand, and when corrugated pipe is mass produced, human error inevitably results in uneven application of the mastic. The mastic thus fails to completely fill all of the spaces between the pipe and the connector element, leavings gaps in the seal. In addition, when the pipes are installed, forces are exerted on the connector element relative to the pipe which cause the mastic seal to fail. As a result, conventional application of mastic is generally inefficient in providing an effective seal between the connector element and the pipe.

In conventional connecting systems as described above, the seal can also be broken by denting the connector between the staples or rivets binding the connector element to the pipe. Also, the staples or rivets tear holes in the material, themselves breaking the seal, and provide structural weak points in the pipe system. Because of such problems, the attachment of connector elements to the pipe sections is often the weak point of a duct constructed from spirally wound corrugated material, and is responsible for much of the loss of ducted material.

SUMMARY OF THE INVENTION

The present invention provides an improved system for attaching a connecting device to the end of a spirally wound corrugated pipe section. A conventional connector element is used which includes a first cylindrical portion adapted to connect to a corresponding connector element and a second cylindrical portion adapted to be inserted into the end of the corrugated pipe section. The outer diameter of the second cylindrical portion is approximately equal to but no greater than the inside diameter of the corrugated pipe section. A collar having a cylindrical portion with an inwardly directed circumferential flange is fitted over the end of the pipe so that the flange is beyond the end of the pipe section. The cylindrical portion of the collar has an inner diameter approximately equal to but no less than the outer diameter of the corrugated pipe section. The cylindrical portion of the connector element inside the end of the pipe section is forced radially outwardly to crush the end of the corrugated pipe segment flat against the collar. An axial portion of the overlapping connector element, pipe section and collar in combination is distended outwardly to form a bead.

By crushing the end of the corrugated pipe segment between the connector element and the collar, the irregular circumference of the end of the corrugated pipe segment becomes relatively smooth. As a result, the spaces between the corrugated pipe segment and the connector element are substantially eliminated about the entire circumference of the pipe section. In addition, the seal between the connector element and the pipe section is completed by forming the bead between the connector element, pipe section and collar in combination. As a result the present invention provides a complete air tight seal between the connecting element and the end of the pipe section about their entire circumference.

In the present invention, the use of mastic is avoided entirely. The system of the present invention can be readily automated, avoiding the inherent uncertainty found in the application of mastic material using hand labor. In addition, the chance of failure in the seal when the material is installed is substantially reduced because of the absence of use of mastic or any equivalent sealing material.

The present invention also avoids entirely the need for fasteners such as staples or rivets which penetrate the pipe section and the connecting element. As a result, no tears are made in the material which are themselves the source of leaks and are structural failure points. In addition, if the material is dented, the seal is usually not affected because the seal circumscribes the entire circumference of the material.

The novel features which are characteristic of the invention, as to organization and method of operation, together with further objects and advantages thereof will be better understood from the following description considered in connection with the accompanying drawings which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an exploded view of the system of the present invention;

FIGS. 2A, B and C are fragmentary sectional elevation views showing the sequence of the construction of the system of the present invention.

DESCRIPTION OF THE PREFERRED EMBODIMENT

The elements of the connecting system provided by the present invention are illustrated by way of reference to FIG. 1. A conventional spirally wound corrugated pipe segment 10 has a rippled configuration at each end such as 11 caused by the corrugations, and a seam 12. Normally, spirally wound corrugated pipe 10 is constructed of aluminum. The present invention provides a preferably steel collar 14 which is connected at 16 to form a continuous circular loop. Collar 14 is basically cylindrical, and includes an inwardly directed flange 18. The present invention further provides a connector element 20, preferably steel. Connector element 20 is basically cylindrical, and includes a first portion 22 having a conventional configuration adapted to attach to a complementary portion of another connector element. Typically, connector portions 22 come in male and female configurations for attachment to one another. Connection element 20 additionally includes a portion 24 which is crimped to facilitate insertion within the end of spirally wound corrugated pipe segment 10. A ridge 26 is formed in connector element 20 for structural rigidity.

As illustrated in FIG. 2A, collar 14 is fitted over the end of spirally wound corrugated pipe segment 10. The inner diameter of the cylindrical portion of collar 14 is approximately equal to but no less than the outer diameter of pipe segment 10. The inwardly directed flange 18 of collar 14 is located at the end of pipe segment 10.

The crimped portion 24 of connector element 20 is then inserted within the end of pipe segment 10. The outer diameter of crimped portion 24 of connector element 20 is approximately equal to but no greater than the inner diameter of pipe segment 10.

Referring next to FIG. 2B, a circumferential die 28 is placed about the outer circumference of collar 14. The inner diameter of die 28 matches the outer diameter of collar 14, except for a circumferential groove 30 formed in the die. With die 28 in place, a swaging roller 32 having a flat forming surface is biased outwardly against the interior of the crimped portion 24 of connector element 20. Roller 30 forces portion 24 of connector element 20 outwardly to crush the end of pipe segment 10 against collar 14 so that the pipe segment end is basically flat.

Concurrent with the flattening of the end of pipe section 10 using flat surfaced roller 32, a swaging roller 34 having a circumferential ridge 36 in its forming surface is also biased outwardly, as illustrated in FIG. 2C. Roller 36 radially outwardly distends a portion of the overlapped crimped portion 24 of connector element 20, end of pipe segment 10, and collar 14 in combination cuts groove 30 in die 28 to form a bead.

In practice, rollers 32 and 34 are mounted on separate armatures 180° apart and biased outwardly in unison so that both rollers act in combination to crush the end of pipe segment 10 flat, while roller 36 forms the bead as illustrated in FIG. 2C.

By crushing the end of pipe segment 10 flat, as illustrated in FIG. 2B, and forming a bead, as illustrated in FIG. 2C, a continuous seal is formed between the end of pipe segment 10 and connector element 20 about their entire circumference. Connector element 20 can be readily connected to a complementary connector element on another pipe segment with mating connector portions such as 22. Accordingly, a continuous pipe can be formed using several segments such as 10, and leakage between the pipe segments and their associated connector elements is substantially avoided.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. A system for installing a device at the end of a spirally wound corrugated pipe section so that two or more such sections can be joined end to end to form a continuous pipe, said system comprising:

a connector element which includes a first portion adapted to connect to a corresponding portion of a second connector element and a second portion extending coaxially from the first portion, said second portion being cylindrical and having an outer diameter approximately equal to but no greater than the inside diameter of the corrugated pipe section, said second cylindrical portion being inserted within the end of said corrugated pipe section so that the first portion projects therefrom;

a collar having a cylindrical portion with an inwardly directed circumferential flange at one end, said cylindrical portion of the collar having an inner diameter approximately equal to but no less than the outer diameter of the corrugated pipe section and fitted over the end of said pipe section so that the flange is beyond said end of the pipe section; and means for forcing the second cylindrical portion of the connector element radially outwardly about its entire circumference to crush the end of the corrugated pipe segment flat against the collar, said forcing means further including means for circumferentially radially outwardly distending an axial portion of the overlapping connector element, pipe section and collar in combination to form a bead, the crushing of the end of the corrugated pipe section and the bead forming a substantially air tight seal between the connector element and the pipe section.

2. A system as recited in claim 1 wherein the forcing means comprises means for swaging the second cylindrical portion of the connecting element outwardly.

3. A system as recited in claim 2 wherein the swaging means includes a pair of rollers, one said roller having a flat circumference and the other said roller having a circumference including a raised flange for distending said axial portion of the overlapping connector element, pipe section and collar in combination.

4. A system as recited in claim 1 wherein the second cylindrical portion of the connector element is crimped prior to being inserted within the end of the corrugated pipe to facilitate such insertion.

5. A method for installing a connecting device at the end of a spirally wound corrugated pipe section comprising:

placing a cylindrical collar partially over the end of the corrugated pipe section, said collar having a cylindrical portion having an inner diameter approximately equal to but no less than the outer diameter of the corrugated pipe section and an inwardly directed circumferential flange beyond said end of the pipe section;

inserting a portion of a cylindrical connector element into the end of the corrugated pipe section so that a part of said connector element projects therefrom, the portion of the connector element inside the end of the corrugated pipe section having an outer diameter approximately equal to but no greater than the inside diameter of the corrugated pipe section;

forcing the portion of the connector element within the end of the corrugated pipe section outwardly to crush the end of the corrugated pipe segment flat against the collar; and distending an axial portion of the overlapping connector element, pipe section and collar in combination to form a bead.

6. A method as recited in claim 5 and additionally comprising the step of crimping the portion of the connector element to be inserted within the end of the corrugated pipe prior to said inserting step to facilitate said inserting step.

7. A method as recited in claim 5 and additionally comprising the step of locating the collar inside a circumferential die to prevent the collar from radially expanding during said forcing step, said die having a circumferential groove permitting limited and confined radial expansion of said axial portion of the collar during said distending step.

* * * * *